(12) United States Patent
Muir

(10) Patent No.: US 10,894,510 B1
(45) Date of Patent: Jan. 19, 2021

(54) VEHICLE BRAKE MESSAGING SYSTEM

(71) Applicant: Doreen Muir, Ocoee, FL (US)

(72) Inventor: Doreen Muir, Ocoee, FL (US)

( * ) Notice: Subject to any disclaimer, the term of this patent is extended or adjusted under 35 U.S.C. 154(b) by 0 days.

(21) Appl. No.: 16/519,234

(22) Filed: Jul. 23, 2019

(51) Int. Cl.
*B60Q 1/26* (2006.01)
*B60Q 1/50* (2006.01)

(52) U.S. Cl.
CPC ............ *B60Q 1/503* (2013.01); *B60Q 1/2665* (2013.01)

(58) Field of Classification Search
CPC .. B60Q 1/0035; B60Q 1/0076; B60Q 1/2665; B60Q 1/503
USPC .......................................................... 340/468
See application file for complete search history.

(56) References Cited

U.S. PATENT DOCUMENTS

| | | | |
|---|---|---|---|
| 3,905,017 A | 9/1975 | Samra | |
| 4,868,542 A | 9/1989 | Thompson | |
| 5,016,996 A | 5/1991 | Ueno | |
| 5,119,278 A | 6/1992 | Watson | |
| 5,379,198 A | 1/1995 | Zhang | |
| 5,574,428 A | 11/1996 | Groover | |
| 6,553,285 B1 * | 4/2003 | Bahmad ................ | B60Q 1/503 116/42 |
| 7,659,808 B1 * | 2/2010 | Cooper .................. | B60Q 1/503 340/425.5 |
| D647,971 S | 11/2011 | Browne | |
| 9,260,054 B1 * | 2/2016 | McHomes ............... | B60Q 1/50 |
| 2003/0127513 A1 * | 7/2003 | Devries, Jr. ............. | G06Q 20/32 235/380 |
| 2005/0134441 A1 * | 6/2005 | Somuah .................. | B60Q 1/503 340/435 |
| 2005/0174228 A1 * | 8/2005 | Lin ............................ | B62J 6/00 340/467 |
| 2005/0274050 A1 * | 12/2005 | Liu .......................... | G09F 9/33 40/544 |
| 2007/0030139 A1 * | 2/2007 | Ellison .................... | B60Q 1/503 340/482 |
| 2008/0284578 A1 * | 11/2008 | Mouratidis ............. | B60Q 1/503 340/468 |
| 2009/0000166 A1 * | 1/2009 | Gallet ...................... | G09F 13/16 40/582 |
| 2012/0098652 A1 * | 4/2012 | Varella .................... | B60Q 1/503 340/425.5 |
| 2012/0313515 A1 * | 12/2012 | Park ......................... | G09F 13/22 313/512 |
| 2014/0002260 A1 * | 1/2014 | Wright .................... | B60Q 1/26 340/468 |
| 2014/0267014 A1 * | 9/2014 | Williams ............... | B60Q 1/503 345/156 |
| 2015/0197185 A1 * | 7/2015 | Jones ........................ | B60Q 1/50 340/468 |
| 2015/0258928 A1 * | 9/2015 | Goto ........................ | B60Q 1/24 701/49 |

FOREIGN PATENT DOCUMENTS

WO   1993011966 A   6/1993

* cited by examiner

*Primary Examiner* — Naomi J Small

(57) ABSTRACT

The vehicular brake messaging system is adapted for use with vehicles. Specifically, the vehicular brake messaging system provides for two signaling lamps that are installed in the electrical system of a vehicle. The two signaling lamps are configured to visually display courtesies initiated by the braking of the vehicle to the drivers of other vehicles. A first signaling lamp displays the phrase "Thank You". The second signaling lamp displays the phrase the "U-Welcome."

15 Claims, 7 Drawing Sheets

VEHICLE BRAKE MESSAGING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including arrangements of signaling devices, more specifically, a spatial arrangement of an optical signaling device relative to the vehicle. (B60Q1/0035)

SUMMARY OF INVENTION

The vehicular brake messaging system is adapted for use with vehicles. Specifically, the vehicular brake messaging system provides for two signaling lamps that are installed in the electrical system of a vehicle. The two signaling lamps are configured to visually display courtesies initiated by the braking of the vehicle to the drivers of other vehicles. A first signaling lamp displays the phrase "Thank You". The second signaling lamp displays the phrase the "U-Welcome."

These together with additional objects, features and advantages of the vehicular brake messaging system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular brake messaging system in detail, it is to be understood that the vehicular brake messaging system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular brake messaging system.

It is therefore important that the claims be regarded as including such equivalent construction insofar as they do not depart from the spirit and scope of the vehicular brake messaging system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
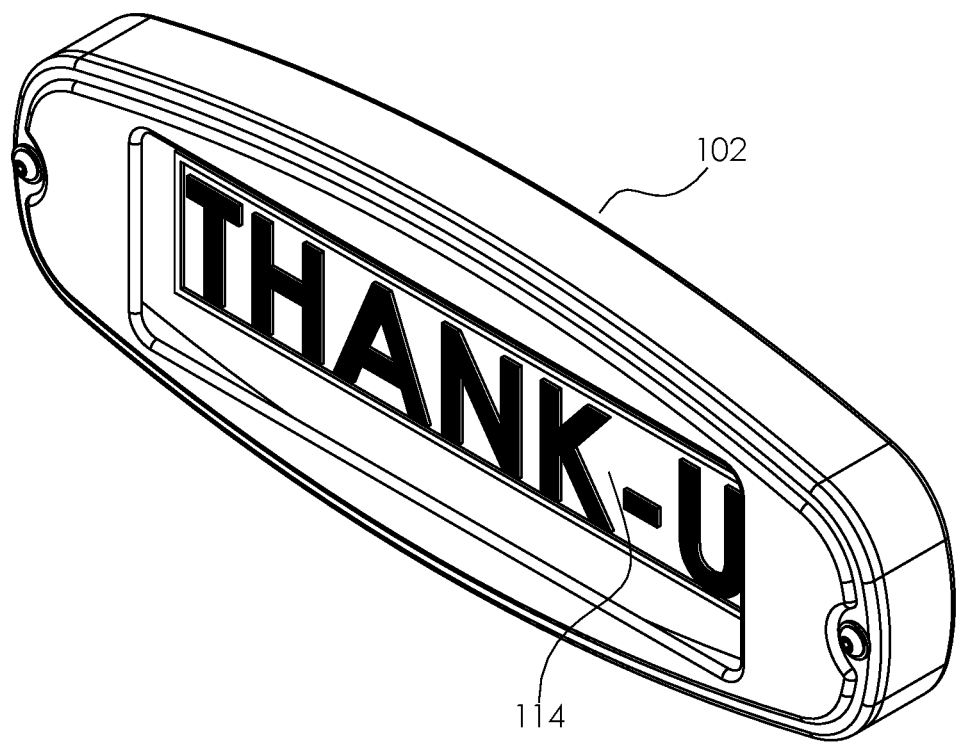
FIG. 1 is a perspective view of an embodiment of the disclosure.
Figure 2:
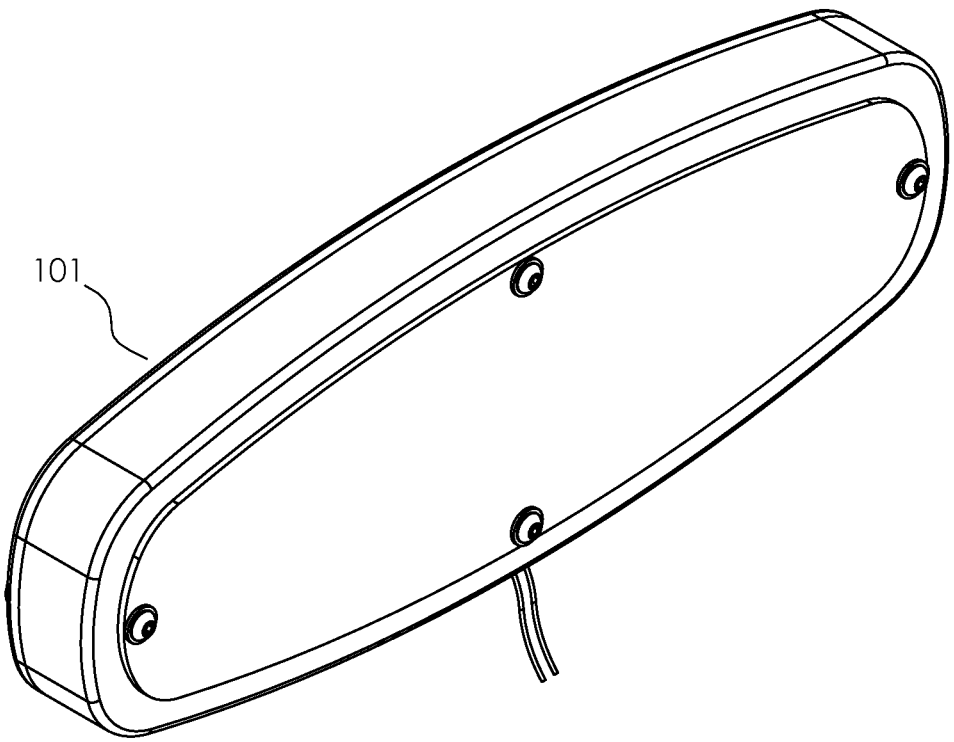
FIG. 2 is a rear perspective view of an embodiment of the disclosure.
Figure 3:
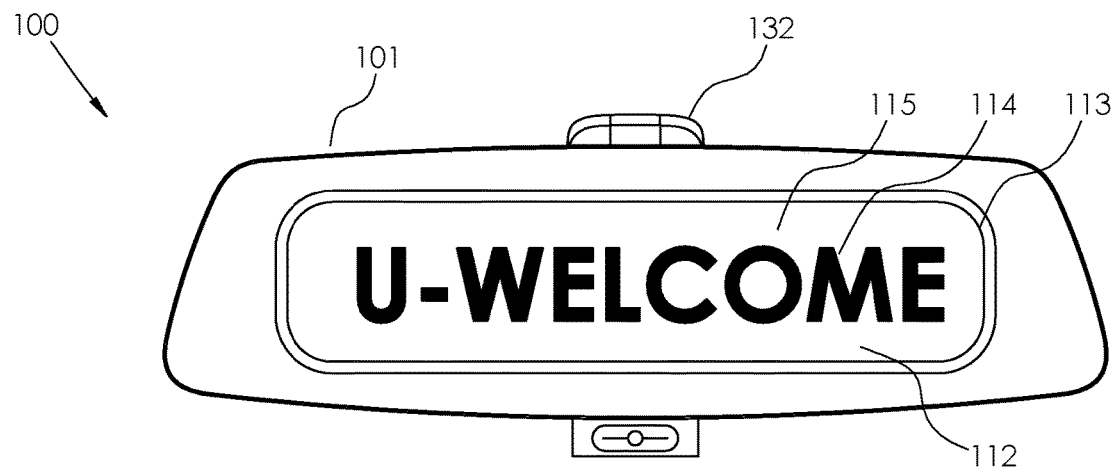
FIG. 3 is a front view of an embodiment of the disclosure.
Figure 4:
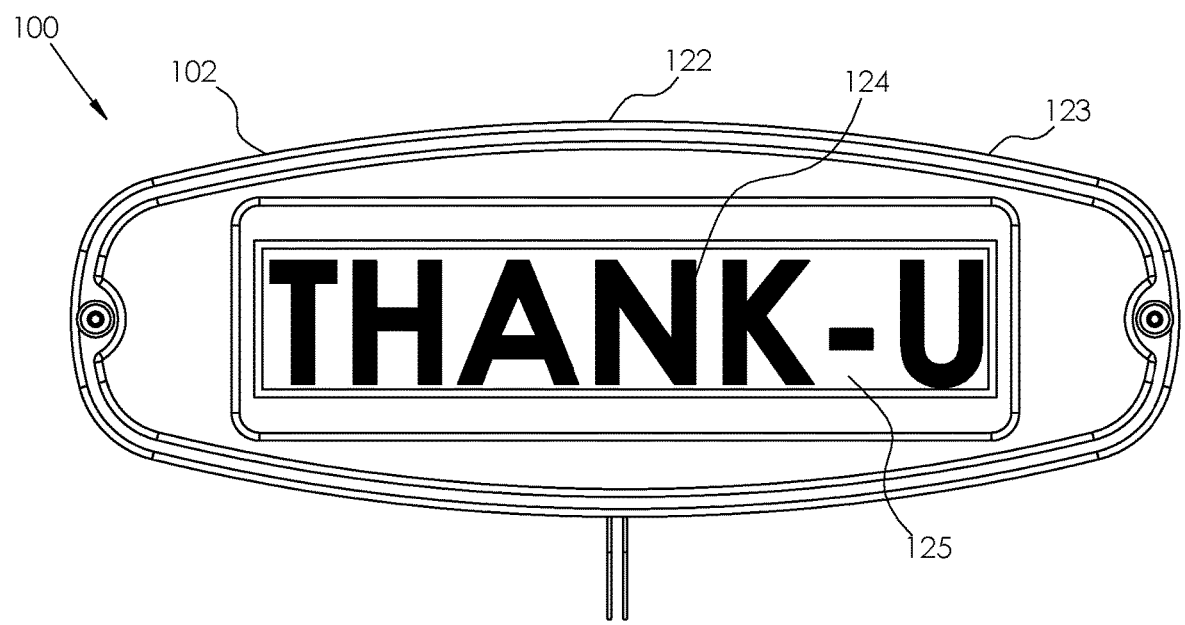
FIG. 4 is a rear view of an embodiment of the disclosure.
Figure 5:
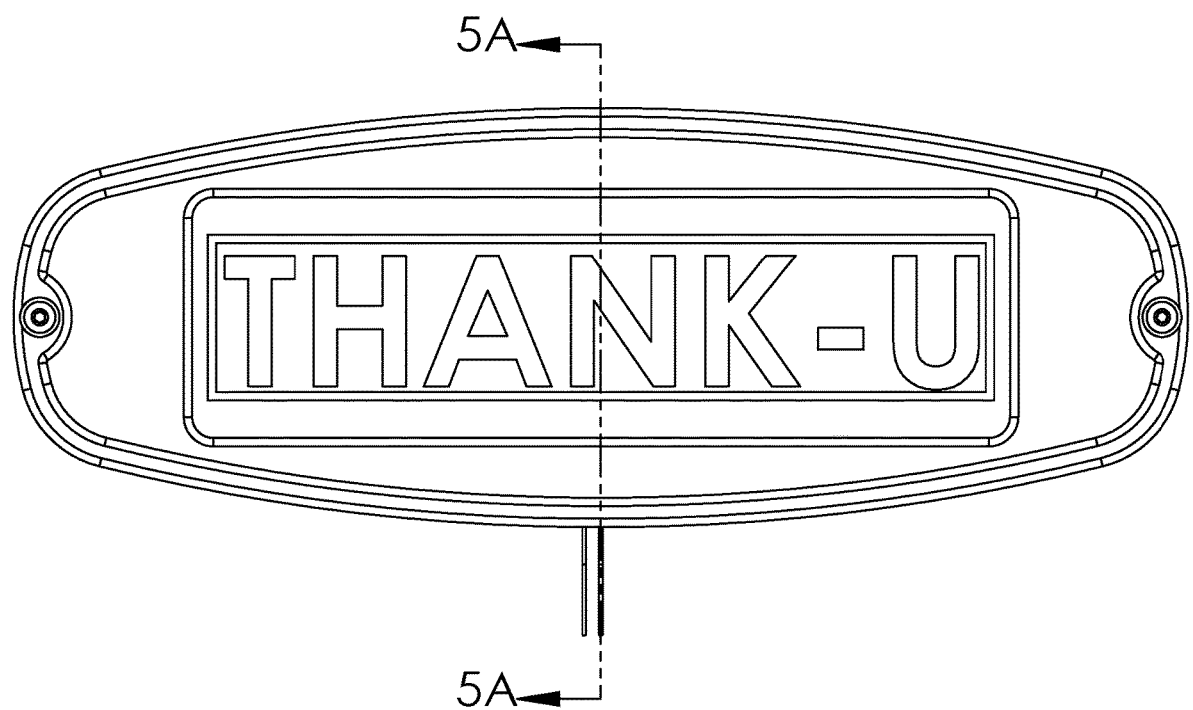
FIG. 5 is a rear view of an embodiment of the disclosure.
Figure 5A:
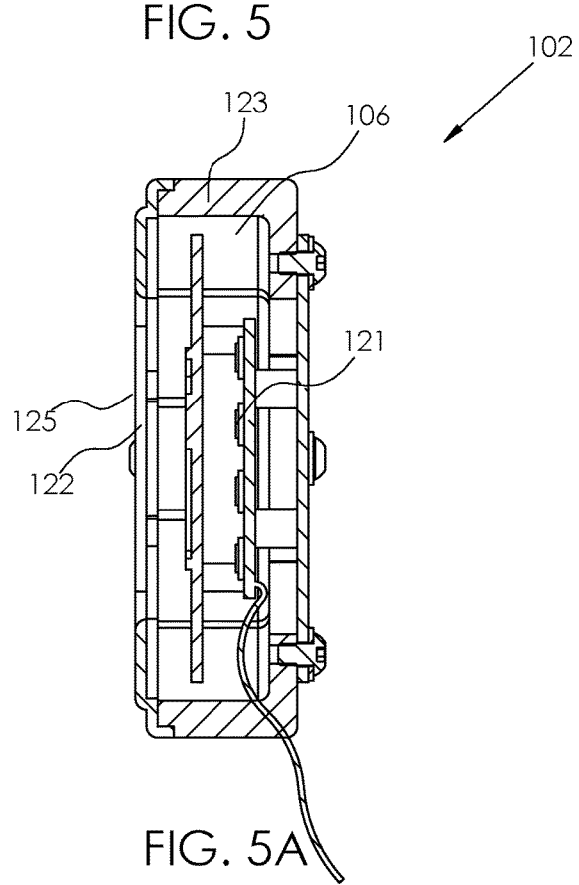
FIG. 5a is a cross-sectional view of an embodiment of the disclosure across 5a-5a as shown in FIG. 5.
Figure 6A:
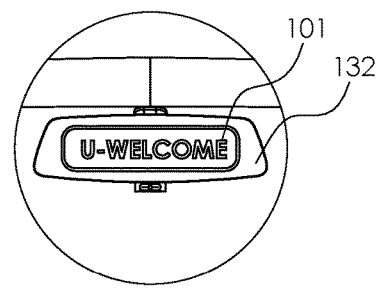
FIG. 6A is a detail view of an embodiment as shown in FIG. 6.
Figure 6:
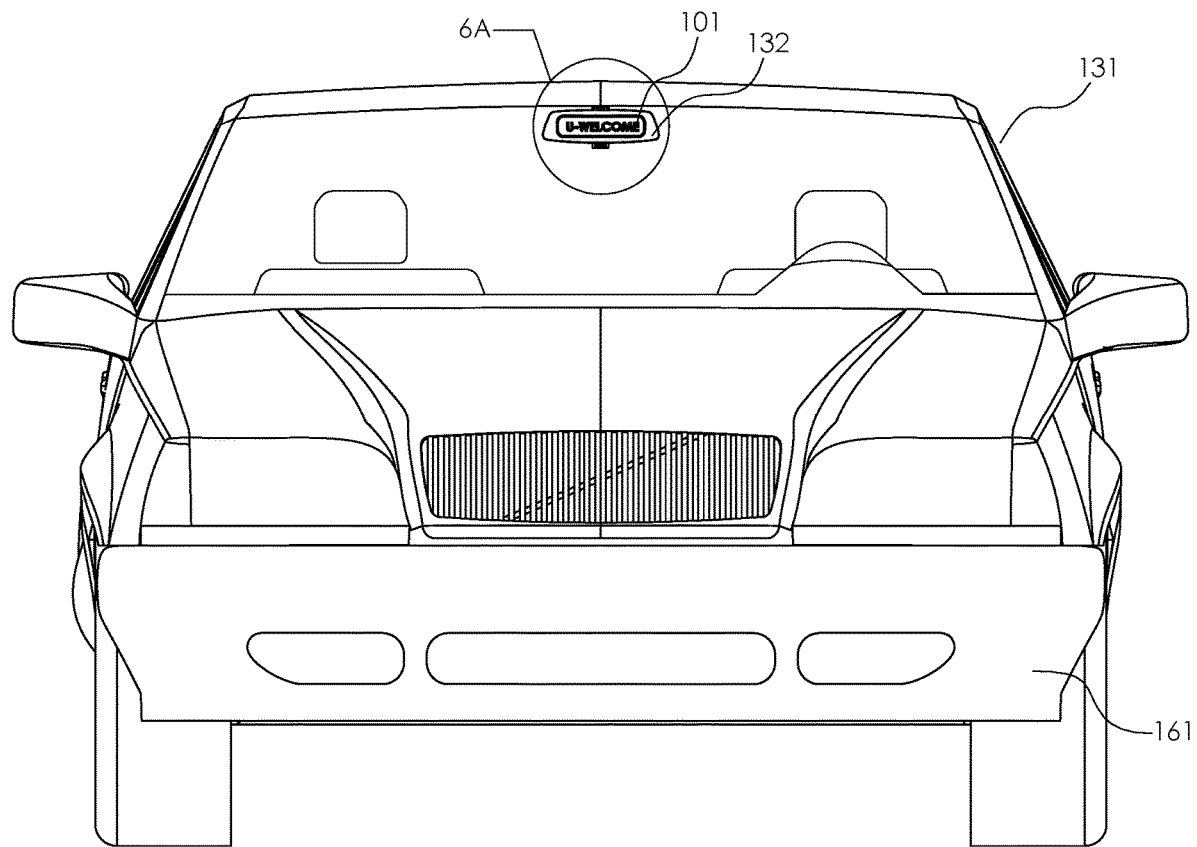
FIG. 6 is an in-use view of an embodiment of the disclosure.
Figure 7:
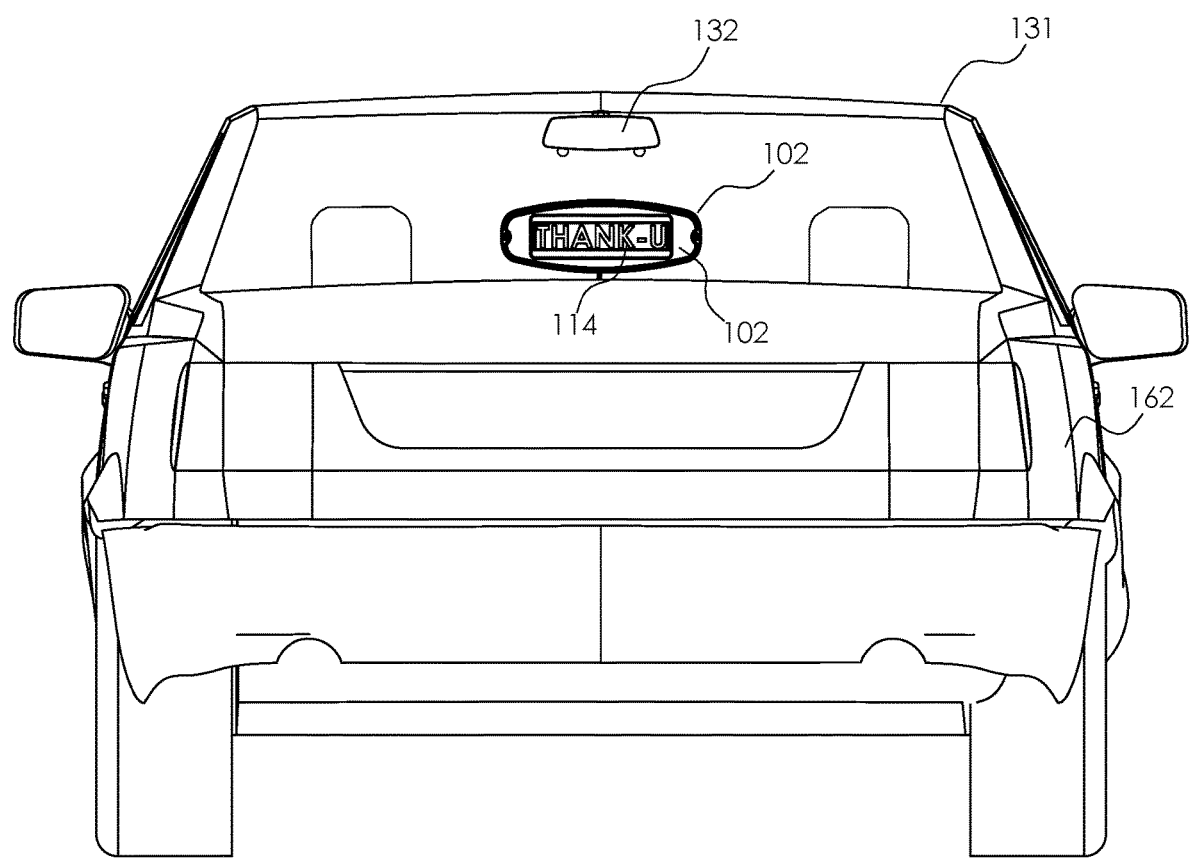
FIG. 7 is an in-use view of an embodiment of the disclosure.
Figure 8:
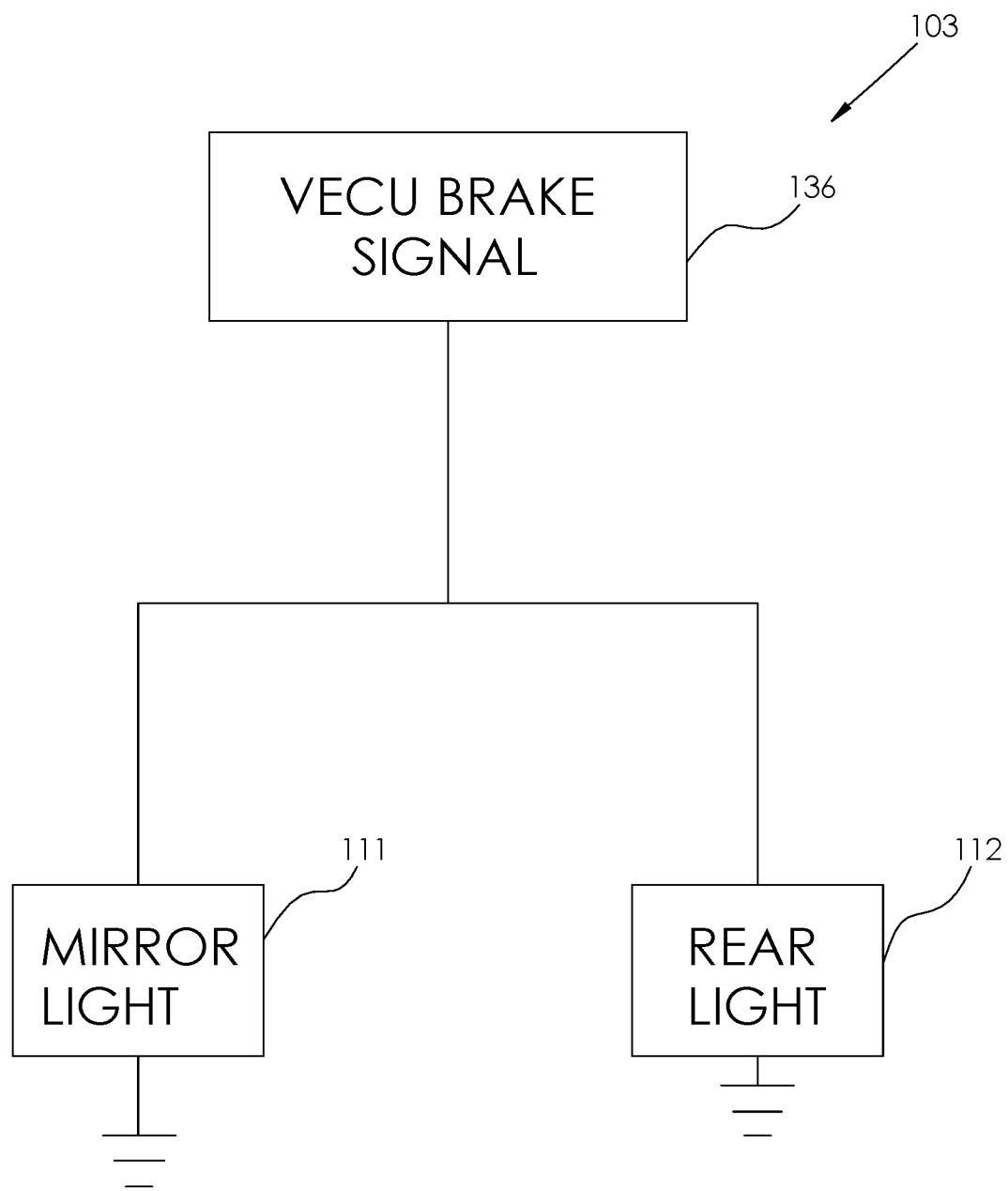
FIG. 8 is a schematic view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 9.

The vehicular brake messaging system 100 (hereinafter invention) comprises a mirror display 101, a rear display 102, and a switching circuit 103. The switching circuit 103 controls the operation of the mirror display 101 and the rear display 102. The invention 100 is adapted for use with a vehicle 131. The vehicle 131 is further defined with a front 161 and a rear 162. The invention 100 is adapted to be installed into the vehicle 131 electrical system 133. The mirror display 101 is configured to display a first courtesy message 114. The rear display 102 is configured to display a second courtesy message 124.

The mirror display 101 further comprises a mirror light 111, a mirror display template 112, and a mirror housing 113. The mirror housing 113 is an enclosure that contains the mirror light 111 and the mirror display template 112. The mirror housing 113 is configured to mount on the rearview mirror 132 of the vehicle 131 such that the mirror display 101 faces the front 161 direction. The interior 106 of the mirror housing 113 is made of a reflective surface that is designed to project the maximum amount of light out of the mirror housing 113. Methods to make such reflective surfaces are well known in the optical arts.

The mirror light 111 is a lamp that is mounted within the mirror housing 113 that is used to illuminate the first courtesy message 114 that is contained in the mirror display template 112. The mirror display template 112 is a stencil type structure that is placed in a first opening 115 through which light is able to exit the mirror housing 113. When the mirror light 111 is illuminated, the mirror display template 112 blocks the light exiting the mirror housing 113 such that the first courtesy message 114 is clearly visible when viewed from the front 161 of the vehicle 131.

The rear display 102 further comprises a rear light 121, a rear display template 122, and a rear housing 123. The rear housing 123 is an enclosure that contains the rear light 121 and the rear display template 122. The rear housing 123 is configured to mount on the rear 162 of the vehicle 131 such that the rear display 102 faces the rear 162 direction. The interior 106 of the rear housing 123 is made of a reflective surface that is designed to project the maximum amount of light out of the rear housing 123. Methods to make such reflective surfaces are well known in the optical arts.

The rear light 121 is a lamp that is mounted within the rear housing 123 that is used to illuminate the second courtesy message 124 that is contained in the rear display template 122. The rear display template 122 is a stencil type structure that is placed in a second opening 125 through which light is able to exit the rear housing 123. When the rear light 121 is illuminated, the rear display template 122 blocks the light exiting the rear housing 123 such that the second courtesy message 124 is clearly visible when viewed from the rear 162 of the vehicle 131.

In the first potential embodiment of the disclosure, the switching circuit 103 comprises a VECU brake signal 136. The VECU refers to the vehicle engine control unit. The VECU is provisioned as part of the vehicle 131 electrical system 133. The VECU brake signal 136 is a switched electrical voltage which is actuated when the brake system of the vehicle 131 is actuated. As shown most clearly in FIG. 8, the VECU brake signal 136 electrically connects in series with the mirror light 111 of the mirror display 101. The VECU brake signal 136 electrically connects in series with the rear light 121 of the rear display 102. The mirror light 111 and the rear light 121 electrically connect in parallel with each other.

In the first potential embodiment of the disclosure, both the first courtesy message 114 and the second courtesy message 124 are illuminated whenever the VECU brake signal 136 is activated.

In a second potential embodiment of the disclosure, the switching circuit 103 of the first potential embodiment of the disclosure further comprises a first switch 141, a second switch 142, a first diode 151, a second diode 152, a third diode 153 and a fourth diode 154. The VECU brake signal 136, the first switch 141, the second switch 142, the first diode 151, the second diode 152, the third diode 153 and the fourth diode 154 are electrically interconnected.

Figure 9:
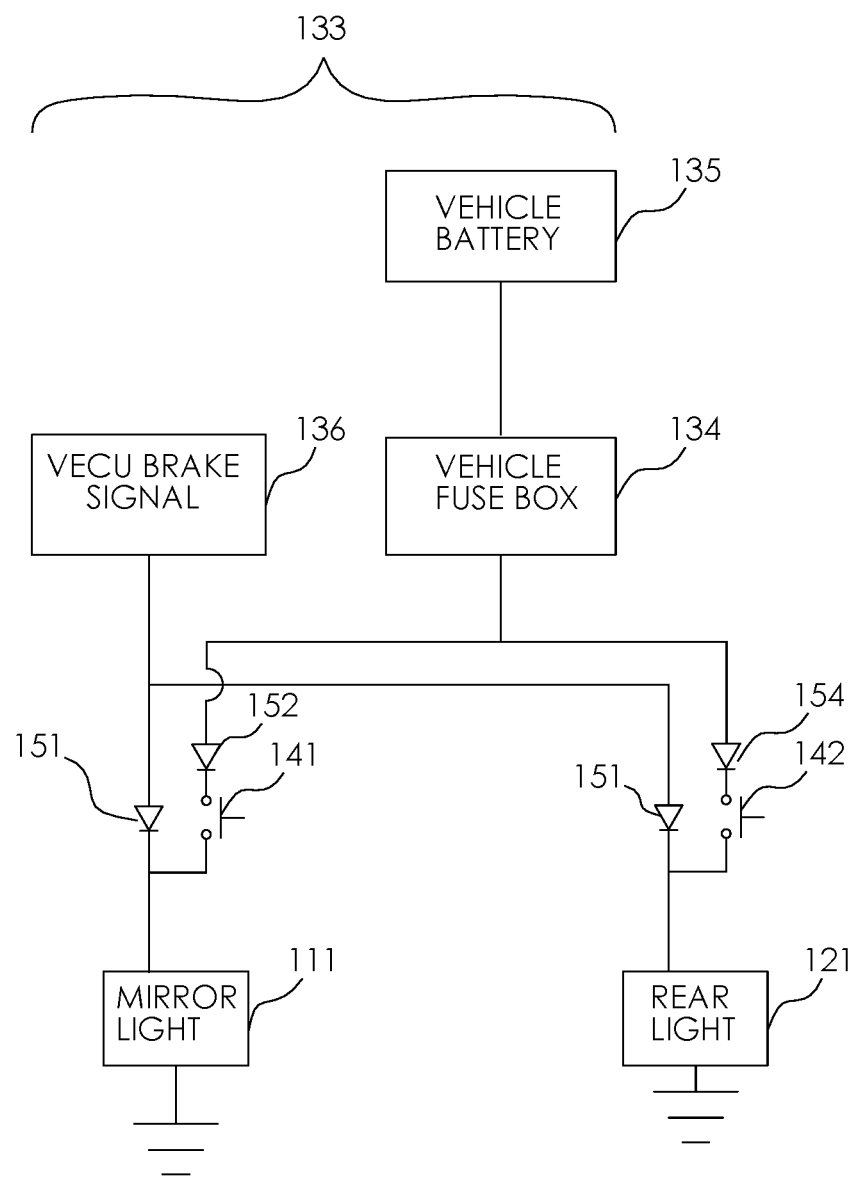
FIG. 9 is a schematic view of an alternate embodiment of the disclosure.

As shown most clearly in FIG. 9, the first switch 141 controls the flow of electricity from the battery 135 and through the fuse box 134 of the vehicle 131 electrical system 133 into the mirror light 111. The first switch 141 electrically connects in series between the fuse box 134 of the vehicle 131 electrical system 133 and the mirror light 111 such that electricity from the fuse box 134 will power the mirror light 111. The flow of electricity from the fuse box 134 to the mirror light 111 is controlled by the first switch 141. The first switch 141 is a normally open momentary switch that will only illuminate the first courtesy message 114 while the first switch 141 is held in the closed position. The first switch 141 is mounted on the mirror housing 113 such that it is readily accessible. The battery 135, the fuse box 134 of the vehicle 131 electrical system 133, and the first switch 141 electrically connect in parallel with the VECU brake signal 136 and the first diode 151 such that both the VECU brake signal 136 and the first switch 141 can operate the mirror light 111.

As shown most clearly in FIG. 9, the second switch 142 controls the flow of electricity from the battery 135 and through the fuse box 134 of the vehicle 131 electrical system 133 into the rear light 121. The second switch 142 electrically connects in series between the fuse box 134 of the vehicle 131 electrical system 133 and the rear light 121 such that electricity from the fuse box 134 will power the rear light 121. The flow of electricity from the fuse box 134 to the rear light 121 is controlled by the second switch 141. The second switch 142 is a normally open momentary switch that will only illuminate the second courtesy message 124 while the second switch 142 is held in the closed position. The second switch 142 is mounted on the mirror housing 113 such that it is readily accessible. The battery 135, the fuse box 134 of the vehicle 131 electrical system 133, and the second switch 142 electrically connect in parallel with the VECU brake signal 136 and the third diode 153 such that both the VECU brake signal 136 and the second switch 142 can operate the rear light 121.

The first diode 151 electrically connects in series between the VECU brake signal 136 and the termination of the first switch 141 and the mirror light 111 such that electric current will not flow from the first switch 141 into the VECU brake signal 136.

The second diode 152 electrically connects in series between the fuse box 134 of the vehicle 131 electrical system 133 and the first switch 141 such that electric current will not flow from the VECU brake signal 136 and through the first switch 141 into the fuse box 134 of the vehicle 131 electrical system 133.

The third diode 153 electrically connects in series between the VECU brake signal 136 and the termination of the second switch 142 and the mirror light 111 such that electric current will not flow from the second switch 142 into the VECU brake signal 136.

The fourth diode 154 electrically connects in series between the fuse box 134 of the vehicle 131 electrical system 133 and the second switch 142 such that electric current will not flow from the VECU brake signal 136 and through the second switch 142 into the fuse box 134 of the vehicle 131 electrical system 133.

To use the second potential embodiment of the disclosure, the driver activates the first switch 141 to illuminate the first courtesy message 114. Alternatively, the driver activates the second switch 142 to illuminate the second courtesy message 124. For example, as shown in FIGS. 1 through 4, in the first potential embodiment of the disclosure, the first courtesy message 114 is "U-Welcome" and the second courtesy message 124 is "Thank You". When a driver allows a second vehicle to merge into traffic ahead of themselves, the driver can activate the first switch 141 to send the courtesy message "U-Welcome" to the second vehicle ahead of the driver. Alternatively, when the driver is allowed to merge into traffic ahead of another second vehicle, the driver can activate the second switch 142 to send the courtesy message "Thank You" to the second vehicle behind the driver.

In the first potential embodiment of the disclosure, the mirror housing 113 is molded as a single unit from plastic. The rear housing 123 is molded as a single unit from plastic. The mirror display template 112 is molded as a single unit from plastic. The rear display template 122 is molded as a single unit from plastic. Suitable plastics include, but are not limited to, polycarbonate. The first courtesy message 114 displayed with the mirror display template 112 is "U-Welcome". The second courtesy message 124 displayed with the rear display template 122 is "Thank You". The mirror light 111 and the rear light 121 are commercially available LED lights. The first switch 141 and the second switch 142 are readily and commercially available normally open momentary switches.

The following definitions and directional references were used in this disclosure:

Battery: As used in this disclosure, a battery is a container consisting of one of more cells, in which chemical energy is converted into electricity and used as a source of power.

Diode: As used in this disclosure, a diode is a two terminal semiconductor device that allows current flow in only one direction. The two terminals are called the anode and the cathode. Electric current is allowed to pass from the anode to the cathode.

Electric Circuit: As used in this disclosure, an electric circuit is a closed loop path through which electrons flow. The closed loop will generally initiate and terminate at an electrical power source.

Housing: As used in this disclosure, a housing is a rigid casing that encloses and protects one or more devices.

Lamp: As used in this disclosure, a lamp is a two-terminal electrical device that generates (typically visible spectrum) electromagnetic radiation.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Switching Circuit: As used in this disclosure, a switching circuit is non-programmable electrical device that receives one or more digital or analog inputs and uses those digital or analog inputs to generate one or more digital or analog outputs.

VECU: As used in this disclosure, the VECU is an acronym for the Vehicle Engine Control Unit of the vehicle. The VECU is an electronic device that controls the operation of all electrical subsystems within a vehicle.

Vehicle: As used in this disclosure, a vehicle is a device that is used transporting carrying passengers, goods, or equipment. The term motorized vehicle refers to a vehicle can move under power provided by an electric motor or an internal combustion engine.

Directional References: The directional references used in this disclosure correspond the directional references from the perspective of the driver of a vehicle. The front 161 is the side of the vehicle proximal to the normal direction of travel. The rear 162 side is the side of the vehicle that is distal from the front 161. A signal from the invention 100 facing the front 161 direction will be visible by somebody facing the front 161 side of the vehicle. A signal from the invention 100 facing the rear 162 direction will be visible by somebody facing the rear 162 side of the vehicle.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A signaling system comprising
a mirror display, a rear display, and a switching circuit;
wherein the switching circuit controls the operation of the mirror display and the rear display;
wherein the signaling system is adapted for use with a vehicle;
wherein the vehicle is further defined with a front and a rear;
wherein the signaling system is adapted to be installed into the vehicle electrical system;
wherein the mirror display is configured to display a first courtesy message;
wherein the rear display is configured to display a second courtesy message;
wherein the mirror display further comprises a mirror light, a mirror display template, and a mirror housing;
wherein the mirror housing contains the mirror light and the mirror display template;
wherein the mirror housing mounts on the rearview mirror of the vehicle such that the mirror display faces the front direction;
wherein the rear display further comprises a rear light, a rear display template, and a rear housing;
wherein the rear housing contains the rear light and the rear display template;
wherein the switching circuit comprises a VECU brake signal;
wherein the VECU brake signal is a switched electrical voltage;
wherein the VECU brake signal electrically connects in series with the mirror light of the mirror display;
wherein the VECU brake signal electrically connects in series with the rear light of the rear display;
wherein the first courtesy message and the second courtesy message are illuminated whenever the VECU brake signal is activated;
wherein the switching circuit further comprises a first switch, a second switch, a first diode, a second diode, a third diode, and a fourth diode;
wherein the vehicle electrical system further comprises a battery and a fuse box;
wherein the VECU, the battery, the fuse box, the first switch, the second switch, the first diode, the second diode, the third diode, and the fourth diode are electrically interconnected.

2. The signaling system according to claim 1 wherein the rear housing is configured to mount on the rear of the vehicle such that the rear display faces the rear direction.

3. The signaling system according to claim 2 wherein the interior of the mirror housing is made of a reflective surface that is designed to project the maximum amount of light out of the mirror housing.

4. The signaling system according to claim 3 wherein the mirror light is a lamp that is mounted within the mirror housing that is used to illuminate the first courtesy message that is contained in the mirror display template.

5. The signaling system according to claim 4
wherein the mirror display template is a stencil type structure that is placed in a first opening through which light is able to exit the mirror housing;
wherein when the mirror light is illuminated, the mirror display template blocks the light exiting the mirror housing such that the first courtesy message is clearly visible when viewed from the front of the vehicle.

6. The signaling system according to claim 5 wherein the interior of the rear housing is made of a reflective surface that is designed to project the maximum amount of light out of the rear housing.

7. The signaling system according to claim 6 wherein the rear light is a lamp that is mounted within the rear housing that is used to illuminate the second courtesy message that is contained in the rear display template.

8. The signaling system according to claim 7
wherein the rear display template is a stencil type structure that is placed in a second opening through which light is able to exit the rear housing;
wherein when the rear light is illuminated, the rear display template blocks the light exiting the rear housing such that the second courtesy message is clearly visible when viewed from the rear of the vehicle.

9. The signaling system according to claim 8 wherein the mirror light and the rear light electrically connect in parallel with each other.

10. The signaling system according to claim 9
wherein the first switch controls the flow of electricity from the battery and through the fuse box of the vehicle electrical system into the mirror light;
wherein the second switch controls the flow of electricity from the battery and through the fuse box of the vehicle electrical system into the rear light.

11. The signaling system according to claim 10
wherein the first switch electrically connects in series between the fuse box of the vehicle electrical system and the mirror light such that electricity from the fuse box will power the mirror light;
wherein the second switch electrically connects in series between the fuse box of the vehicle electrical system and the rear light such that electricity from the fuse box will power the rear light.

12. The signaling system according to claim 11
wherein the first switch is a normally open momentary switch that will only illuminate the first courtesy message while the first switch is held in the closed position;
wherein the second switch is a normally open momentary switch that will only illuminate the second courtesy message while the second switch is held in the closed position.

13. The signaling system according to claim 12
wherein the battery, the fuse box of the vehicle electrical system, and the first switch electrically connect in parallel with the VECU brake signal and the first diode such that both the VECU brake signal and the first switch can operate the mirror light;
wherein the battery, the fuse box of the vehicle electrical system, and the second switch electrically connect in parallel with the VECU brake signal and the third diode such that both the VECU brake signal and the second switch can operate the rear light.

14. The signaling system according to claim 13
wherein the first diode electrically connects in series between the VECU brake signal and the termination of the first switch and the mirror light such that electric current will not flow from the first switch into the VECU brake signal;
wherein the second diode electrically connects in series between the fuse box of the vehicle electrical system and the first switch such that electric current will not flow from the VECU brake signal and through the first switch into the fuse box of the vehicle electrical system;
wherein the third diode electrically connects in series between the VECU brake signal and the termination of the second switch and the mirror light such that electric current will not flow from the second switch into the VECU brake signal;
wherein the fourth diode electrically connects in series between the fuse box of the vehicle electrical system and the second switch such that electric current will not flow from the VECU brake signal and through the second switch into the fuse box of the vehicle electrical system.

15. The signaling system according to claim 13
wherein the first switch is mounted on the mirror housing;
wherein the second switch is mounted on the mirror housing.

* * * * *